United States Patent [19]

Schmidt et al.

[11] Patent Number: 4,505,985
[45] Date of Patent: Mar. 19, 1985

[54] MEMBRANES BASED ON SILICIC ACID HETEROPOLYCONDENSATES AND A PROCESS FOR THEIR PRODUCTION

[75] Inventors: Helmut Schmidt, Höchberg; Alfred Kaiser, Kist; Horst Scholze, Würzburg, all of Fed. Rep. of Germany

[73] Assignee: Fraunhofer-Gesellschaft, Munich, Fed. Rep. of Germany

[21] Appl. No.: 491,173

[22] Filed: May 3, 1983

[30] Foreign Application Priority Data

May 6, 1982 [DE] Fed. Rep. of Germany ....... 3217047

[51] Int. Cl.$^3$ .............................................. B32B 9/04
[52] U.S. Cl. ................................. 428/447; 210/500.2; 427/248.1; 427/255; 427/255.2; 427/255.3; 427/302; 427/322; 427/326; 427/387; 427/266; 528/10; 528/31; 528/32; 528/38; 528/39

[58] Field of Search ............... 427/322, 255, 326, 299, 427/324, 387, 248.1, 389.8, 301, 302, 391, 399, 255.2, 255.3, 255.6, 421, 400; 210/490, 500.2, 506; 428/266, 447, 429, 446, 268; 528/10, 31, 32, 38, 39; 521/51, 154

[56] References Cited

U.S. PATENT DOCUMENTS

| | | | |
|---|---|---|---|
| 2,474,704 | 6/1949 | Thayer | 427/255.6 |
| 4,238,590 | 12/1980 | Scholze et al. | 528/5 |
| 4,243,692 | 1/1981 | Scholze et al. | 528/32 |
| 4,374,696 | 2/1983 | Schmidt et al. | 427/387 |
| 4,374,933 | 2/1983 | Scholze et al. | 521/64 |
| 4,393,113 | 7/1983 | Sugie et al. | 210/500.2 |

*Primary Examiner*—S. L. Childs
*Attorney, Agent, or Firm*—Oblon, Fisher, Spivak, McClelland & Maier

[57] ABSTRACT

Membranes based on silicic acid heteropolycondensates are produced by hydrolytic polycondensation of at least one silicic acid derivative in the presence of water and, if appropriate, a condensation catalyst, the polycondensation being carried out at the surface of a support, which supports the resulting membrane. The reactants can be fed to the surface of the support via the gas phase or via one or more liquid phases.

24 Claims, No Drawings

MEMBRANES BASED ON SILICIC ACID HETEROPOLYCONDENSATES AND A PROCESS FOR THEIR PRODUCTION

BACKGROUND OF THE INVENTION

1. Field of the Invention

The invention relates to a process for the production of membranes based on silicic acid heteropolycondensates, which makes possible the direct production even of very thin membrane layers on a support.

2. Description of the Prior Art

Membranes based on silicic acid heteropolycondensates exhibit an excellent resistance to acids and organic solvents and are also quite stable within the pH range up to about 10. In addition, their structural properties, for example hydrophilic or hydrophobic character, porosity and the like, can be varied within wide ranges if the nature and concentration of the starting compounds and catalysts and also the conditions of preparation are chosen suitably.

It is known from U.S. Pat. No. 4,238,590 to convert silicic acid heteropolycondensates into membranes by mechanically cutting the polycondensates, which are produced in compact blocks, to give very thin slices which are then employed as membranes without further treatment or after prior smoothing. However, since the silicic acid heteropolycondensates are often insufficiently elastic, the slices of membrane break when cut, and the membrane surface required is also not achieved in most cases by this method.

A further process for the production of membranes consists in pouring a solution of the silicic acid heteropolycondensate in an organic solvent onto a plane support and allowing the solvent to evaporate. However, the membrane film obtained in this manner is not reinforced and is therefore insufficiently mechanically stable.

U.S. Pat. No. 4,374,933 describes another process for the production of porous membranes based on silicic acid heteropolycondensates at the interface between an organic phase and an aqueous phase. However, since the resulting membranes contain a great deal of water by virtue of contact with an aqueous phase, there is a risk, when they are dried, of excessive shrinking and associated crack formation.

The hydrolytic polycondensation of the starting components to form silicic acid heteropolycondensates takes place with loss of substance (elimination of water and loss of solvent), so that shrinkage of the polycondensates inevitably results. Hitherto, therefore, it has not been considered possible to carry out the production and drying of the membrane directly on a supporting or reinforcing base: on the contrary, it had been expected that the membrane therein would tear under the arising stress.

It has now been found, surprisingly, that, when the starting components are reacted on the surface of a support, a membrane film is formed, which, on drying, remains coherent and does not tear in spite of the shrinkage to be expected. It has also been found that, particularly if one or more reactants are brought direct to the surface of the support via a gas phase, membranes having excellent physical and mechanical properties are obtained in the form of a thin surface film.

SUMMARY OF THE INVENTION

In the process according to the invention, the hydrolytic polycondensation of the silicic acid derivative(s) and of the optionally used oxide components is effected in the presence of water and, if appropriate, a condensation catalyst at the surface of a support, which supports the resulting membrane.

DESCRIPTION OF THE INVENTION

In this process, one or more, for example all, of the reactants are preferably brought to the surface of the support via the gas phase. This is effected by bringing the untreated support, or a support which has been pretreated with one or more reactants, into contact with one or more other reactants in gaseous form. Although, in principle, any desired combinations can be used in this process, it is preferable to impregnate the support with water and, if appropriate, the condensation catalyst, or to pretreat it in the gas phase and then to feed the silicic acid derivative to the surface of the support via the gas phase.

Another variant consists in impregnating or coating the support with the silicic acid derivative and then feeding the water and, if appropriate, the condensation catalyst to the surface of the support via the gas phase. The support can be impregnated or coated with the silicic acid derivative by using the latter in and undiluted form or as a solution in a suitable organic solvent.

In multi-component systems, the composition of the membrane can be controlled via the partial pressure of the individual components. This can be effected, for example, by (1) suitably choosing the composition of the mixture of individual components to be vaporized and then heating this mixture to the appropriate temperature, or (2) heating the individual components separately to the temperature required in order to reach the necessary partial pressure. Particularly for the production of very thin membranes, it is also possible to control the partial pressure of the gaseous individual components by passing a stream of inert gas, for example nitrogen, into the gas phase composed of the vaporous or vaporized reactants. In multicomponent systems the vaporous or vaporized reactants can be fed to the surface of the support simultaneously or successively, so that it is also possible to produce composite membranes.

In practice, the reactants are fed via the gas phase in such a way that the support is located at a suitable distance, preferably at a distance of 0.5 to 20 cm, above the agent to be vaporized. If liquid supports are used, the reactants to be vaporized are distilled, for example onto the surface of a liquid support contained in a separate vessel.

The pressure and temperature are not specially limited in the gas phase reaction, but depend on the nature of the reactants and the particular apparatus. The gas phase reaction is usually carried out at room temperature up to about 150° C., preferably up to the boiling point of the vaporizing or volatile component. The reaction can be carried out, for example, in air or in an inert gas atmosphere under normal pressure, elevated pressure or reduced pressure, preferably under normal pressure. The duration of action of the reactants on the support depends on the membrane thickness desired and on the process conditions, but is generally 0.5 minutes to several hours.

In another embodiment of the process according to the invention, one or more reactants are fed to the surface of the support via a liquid phase. Here too, in principle, any desired combinations are possible. For example, a support which has been pretreated with water and, if appropriate, condensation catalyst can be brought into contact with the surface of a solution of the silicic acid derivative in an organic solvent, or one or more reactants are sprayed, simultaneously or successively, in undiluted form or as aqueous or organic solutions, onto the surface of the untreated support or the support which has been pretreated with one or more other reactants.

In a particularly preferred embodiment of the liquid phase process, one or more, for example all, of the reactants are brought up, via two, mutually immiscible liquid phases, to the surface of the support, which in this case is untreated or has been treated with one or more other reactants and which is located at the interface between the two liquid phases. For example, a support which is untreated or has been pretreated with catalyst can be fixed at the interface between two liquid phases.

The two, mutually immiscible phases can be any desired aqueous and nonaqueous systems, for example in the form of two organic phases, for instance one phase composed of aliphatic, cycloaliphatic, aromatic or aliphatic-aromatic hydrocarbons or halogenated hydrocarbons, such as petroleum ether, pentane, cyclohexane, benzene, toluene or carbontetrachloride, and the other phase composed of alcohols, such as methanol, ethanol, n-propanol, isopropanol and n-butanol. Alternatively, the first phase can also be composed of the said hydrocarbons and halogenated hydrocarbons or ethers, such as diethyl ether and tetrahydrofuran, and the other phase can be composed of water or aqueous solutions.

In the liquid phase reaction also, the pressure and temperature are not specially limited. The reaction is usually carried out at $-20°$ to $+150°$ C., preferably at room temperature, and under reduced or elevated pressure, preferably normal pressure. The treatment time is also usually 0.5 minutes to several hours.

The membranes obtained on the surface of the support in accordance with one of the processes described above are preferably dried for 1 to 24 hours at temperatures from room temperature to 120° C. and/or are heat-treated (cured) for 10 minutes to 24 hours at 50 to 250° C. If appropriate, a treatment with water or steam at room temperature up to 150° C. can be carried out for 1 minute to 1 hour prior to the heat treatment.

Depending on their composition and the conditions of production, the membranes which can be produced in accordance with the invention are impervious or porous and have a thickness of, for example, <1 μm up to 500 μm. Their physical shape depends on the nature of the support used. Usually, flat membranes are produced, but the invention also embraces, for example, hollow fiber and tube membranes.

Suitable supports are any desired porous or impervious materials, for example materials in the form of grids, sieves, fabrics, needle felts, nonwovens, sheets, foils or shaped articles. Examples of materials which can be used are plastics, such as polyethylene, polypropylene, polytetrafluoroethylene and polyamides, cellulose, cellulose derivatives, glasses, porous glasses, sintered ceramics, metals and carbon. Examples of preferred supports are fabrics and nonwovens made of plastic fibers, glass fibers, ceramic fibers or carbon fibers and types of paper, such as filter paper.

Porous supports can, if appropriate, be impregnated with a filler, for example polymers, waxes or paraffins, which can be removed (for example can be melted out or dissolved out) again after the formation of the membrane. After being produced, the membrane can be detached again from supports of this type, and also from suitable impervious, solid supports or liquid supports, such as mercury or paraffin oil, which are of particular interest for the gas phase reaction.

Examples of silicic acid derivatives which can be used are one or more silanes of the general formula $$SiR_a(R'Y)_b X_{(4-a-b)}$$

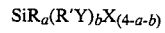

in which R denotes alkyl, alkenyl, aryl, arylalkyl, alkylaryl, arylkenyl or alkenylaryl; R' represents alkylene, phenylene, alkylenephenylene or alkenylene, it being possible for these radicals to be interrupted by oxygen or sulfur atoms or —NH— groups; Y is halogen or an optionally substituted amino, quaternary ammonium, amide, polyamide, aldehyde, keto, carboxyl, hydroxyl, polyol, mercapto, cyano, diazo, carboxylic acid alkyl ester, sulfonic acid, phosphoric acid, acryloyloxy, methacryloyloxy, epoxide or vinyl group; X denotes hydrogen, halogen, hydroxyl, alkoxy, acyloxy or —NR"$_2$ (R"=hydrogen and/or alkyl), but not all the radicals X are hydrogen, and a and b have the value 0, 1, 2 or 3, (a=b) not being greater than 3.

Particular examples of these silanes are described in German Offenlegungsschriften Nos. 2,758,414, 2,758,415, 2,925,969, 3,011,761 and 3,048,369.

If several starting silanes are used, the ratios thereof are not specially limited, but depend on the properties desired for the membranes. Instead of the monomeric silanes, it is also possible to use, as silicic acid derivatives, precondensates of these silanes which can be obtained by subjecting the starting components to a nonhydrolytic precondensation, if appropriate in the presence of a condensation catalyst and/or an organic solvent. This precondensation can be carried out, for example, for 1 minute to 24 hours at $-20°$ to $+130°$ C., highly fluid oligomers having a degree of polymerization corresponding to about 10 to 20 monomer units being obtained. As well as the silane homoprecondensates, it is also possible to employ corresponding coprecondensates containing the oxide components mentioned below.

The optionally used oxide component is derived from elements of the main groups Ia to Va or of the subgroups Ivb or Vb of the periodic system. In this connection, oxide components of Ti, Zr, B, Al or V are preferred, those of Ti being preferred particularly. In the gas phase reaction, the oxide component is composed, for example, of a volatile compound which forms a sparingly volatile oxide under the reaction conditions. Compounds which are soluble in, or homogeneously miscible with, the liquid phase and which form a sparingly volatile oxide under the reaction conditions are used in the liquid phase reaction. Special oxide components of this type are also described in the Offenlegungsschriften mentioned.

If several starting silanes and/or oxide components are used, these can be fed to the surface of the support either simultaneously or successively, so that composite membranes can be produced.

The quantity of water used for the hydrolytic polycondensation or completion of the condensation of the precondensates is not limited. The quantity of water usually employed is 10 to 150% of the quantity required by stoichiometry for the complete hydrolysis of the hydrolyzable groups present.

Suitable catalysts are any desired compounds which provide protons or hydroxyl ions, for example organic or inorganic acids or bases, including amines and acid or basic ion exchange resins. Examples of suitable catalysts are also given in the Offenlegungsschriften mentioned above. In accordance with the invention, the quantity of catalyst is not limited, but can be selected within wide limits.

The membranes produced in accordance with the invention can be clamped or inserted in filter frames or cassettes in a customary manner, and are suitable, for example, for retaining and removing fine particles or ionic or molecular compounds from liquid or gaseous media, for hyperfiltration, reverse osmosis and dialysis and generally for liquid/liquid, liquid/solid, solid/gaseous, liquid/gaseous and gaseous/gaseous separations.

Depending on the nature of the substance to be retained, silicic acid heteropolycondensates formed from starting silanes having hydrophilic or hydrophobic or acid or basis etc. substituents are used. If a hydrophilic compound is to be retained, the starting silanes mainly contain hydrophobic substituents, for example aryl and aralkyl radicals. If, on the other hand, a hydrophobic compound is to be retained, it is preferable to use starting silanes having hydrophilic substituents, for example hydroxyl, ester or acid radicals. The membranes according to the invention can also be employed as ion exchange membranes, either by employing suitably substituted starting silanes or by modifying the membranes in the manner described below with agents for forming derivatives, so that they contain suitable groups for the ion exchange, for example tertiary or quaternary amino groups, phenolic hydroxyl groups or aliphatic or aromatic —$SO_3^-$ or —$COO^-$ groups.

The membranes according to the invention make it possible to adjust in any desired way to suit specific problems set. Any desired combinations of properties, for example in respect of resistance to chemicals and heat or mechanical and absorption properties, can be achieved by suitably selecting the starting components and the ratios thereof.

In this connection, it can be advantageous to modify the functional groups of the silicic acid heteropolycondensates or of the membranes prepared therefrom, in accordance with customary methods of organic chemistry. Depending on the reactivity of the compounds or substances to be retained, the silicic acid heteropolycondensate can be converted into derivatives and/or coupled to another compound. Examples of suitable agents for forming derivatives are amines, carboxylic acids, acid chlorides, thiocarbamates, thiocarbamyl chlorides, diazo compounds, esters, sulfides and the like. The modification of a membrane containing γ-aminopropyl groups can, for example, be effected by treating the membrane for 30 to 60 minutes at room temperature with a 2.5% strength aqueous solution of glutaraldehyde. The diazo derivative can be prepared, for example, by reaction with p-nitrobenzoyl chloride, reduction of the nitro group to give the amine and diazotization with nitrous acid. If the membrane already contains anilino groups as a result of the use of suitable functional silanes, diazotization with nitrous acid can be carried out immediately. Reacting amino groups of the membrane with thiophosgene gives the isothiocyano derivative.

The membranes according to the invention are distinguished by excellent mechanical strength, ability to resist heat, resistance to solvents and good swelling behavior.

The following examples illustrate the invention, without limiting it.

EXAMPLES

Example 1

A filter paper is impregnated with aqueous 2 N HCL and suspended over a mixture of 70 mole percent of tetraethoxysilane and 30 mole percent of dimethyldiethoxysilane, at a distance of approx. 5 cm, at room temperature. The substrate which has been coated in this way is dried for 1 hour at 110° C.

Example 2

A commercially available glass fiber nonwoven is held for 10 minutes, at a temperature of 80° C., over a concentrated aqueous solution of $NH_3$, at a distance of 5 cm, is subsequently fixed over a vessel containing tetramethoxysilane for 0.5 minutes, at room temperature, and is then dried for 1 hour at 110° C.

Example 3

3 ml of tetramethoxysilane are dissolved in 30 ml of carbon tetrachloride and the solution is covered with a layer of 20 ml of $H_2O$. A commercially available glass fiber nonwoven is fixed at the phase interface, and 2 ml of 6 N HCL are added carefully to the aqueous phase. After 30 minutes, the organic phase is drained off and the substrate, together with the adhering membrane, is dried for 2 hours at a temperature which is increased gradually from 70° C. to 110° C.

Example 4

21.0 ml of (3-glycidyloxypropyl)-trimethoxysilane and 7.2 ml of (3-methacryloyloxypropyl)-trimethoxysilane are heated at 110° C., together with 0.1 g of azoisobutyronitrile, until the band in the IR spectrum at 1640 cm$^{-1}$ has disappeared. 1.0 g of tetraethyl titanate and 20.0 ml of ethanol are added and the mixture is heated to reflux temperature. 3.0 ml of anhydrous methanolic 1 N hydrochloric acid are added to the solution and heating is continued for a further 120 minutes under reflux, in the course of which further 3.0 ml portions of ethanolic 1 N hydrochloric acid are added after 30, 60 and 90 minutes. This solution is evaporated at 70° C. under a water pump vacuum and the residue is taken up again in 20 ml of ethanol. A filter paper is wetted with this solution and fixing is carried out at 80° C. for 0.5 hours at a distance of 10 cm above a water bath. The substrate is then dried for 2 hours at 130° C.

Example 5

A commercially available glass fiber nonwoven is wetted with concentrated hydrochloric acid and is then fixed for 5 minutes, at room temperature, at a distance of approx. 5 cm above a vessel containing tetramethoxysilane. The substrate is then dried for 1 hour at 110° C. In each of several cycles, the coated nonwoven is first charged with dust until its initial pressure drop has risen from 400 Pa to over 1,000 Pa and then cleaned once more by vibration.

What is claimed is:

1. A process for the production of membranes of silicic acid heteropolycondensates comprising:

(a) forming said membrane at the surface of a solid support by
(I) providing the solid support;
(II) impregnating or pretreating in the gas phase the surface of the support with water alone or in combination with a condensation catalyst; and
(III) feeding at least one silane selected from the group having the formula $$SiR_a(R'Y)_b X_{(4a-b)}$$

wherein
R is alkyl, alkenyl, aryl, arylalkyl, alkylaryl, arylalkenyl or alkenylaryl;
R is alkylene, phenylene, alkylenephenylene or alkenylene, which can be further interrupted by oxygen or sulfur atoms or —NH— groups;
Y is halogen or a substituted amino, quaternary ammonium, amide, polyamide, aldehyde, keto, carboxyl, hydroxyl, polyol, mercapto, cyano, diazo, carboxylic acid alkyl ester, sulfonic acid, phosphoric acid, acryloyloxy, methacryloyloxy, epoxide or vinyl group;
X is hydrogen, halogen, hydroxyl, alkoxy, acyloxy or —NR''$_2$; wherein R'' is hydrogen and/or alkyl, with the proviso that not all X are hydrogen; and
a and b are 0–3, with the proviso that (a+b) are not greater than 3;
thereby obtaining the membrane by hydrolytic polycondensation.

2. The process as claimed in claim 1, wherein one or more reactants selected from the group consisting of water, catalyst and silane are brought to the surface of the support via the gas phase.

3. The process as claimed in claim 2, wherein all the reactants are fed to the surface of the support via the gas phase.

4. The process as claimed in claim 2, wherein the support is first impregnated or pretreated in the gas phase with water alone or in combination with a condensation catalyst of step (II), and then the silane(s) of step (III) is/are fed to the surface of the support via the gas phase.

5. The process as claimed in claim 1, wherein the support is first impregnated or coated with the silane of step (III), and then the water alone or in combination with the condensation catalyst is fed to the surface of the support via the gas phase of step (II).

6. The process as claimed in claim 1, wherein one or more reactants are fed to the surface of the support via the liquid phase.

7. The process as claimed in claim 6, wherein the reactants are fed via two mutually immiscible liquid phases, at the interface between which the support is located.

8. The process as claimed in claim 6, wherein a support which has been pretreated with water alone or in combination with a condensation catalyst, is brought into contact with the surface of a solution of the silicic acid derivative(s) in an organic solvent.

9. The process as claimed in claim 6, wherein one or more reactants are sprayed, in undiluted form or as aqueous or organic solutions, onto the surface of the support prior to treating, or onto the support which has been pretreated with one or more other reactants.

10. The process as claimed in claim 7, wherein a support prior to treating or a support which has been pretreated with water, a condensation catalyst or a combination thereof is located at the interface between the two liquid phases.

11. The process as claimed in claim 7, wherein two mutually immiscible organic phases are used.

12. The process as claimed in claim 7, wherein an aqueous liquid phase and an organic liquid phase are used.

13. The process as claimed in claim 1, wherein several silanes are fed in step (III) to the surface of the support simultaneously or successively.

14. The process as claimed in claim 1, wherein at least one oxide component is used in step (III) additionally to the silanes.

15. The process as claimed in claim 14, wherein several silanes, the oxide components or a combination thereof, are fed in step (III) to the surface of the support simultaneously or successively.

16. Membranes which can be produced by the process of claim 1.

17. Membranes which can be produced by the process of claim 14.

18. The process of claim 1 wherein the solid support is made of a material selected from the group consisting of polyethylene, polypropylene, polytetrafluoroethylene and polyamides, cellulose, cellulose derivatives, non-porous glasses, porous glasses, sintered ceramics, metals, carbon and a combination thereof.

19. The process of claim 1 wherein the solid support is selected from the group consisting of grids, sieves, fabrics, needle felts, nonwovens, sheets, foils and shaped articles.

20. The process of claim 1 wherein the formed membrane has a thickness of up to 500 μm.

21. The process of claim 1 wherein the thus formed membrane is further modified by treating said membrane with an agent selected from the group consisting of amines, carboxylic acids, acid chlorides, thiocarbamates, thiocarbamyl chloride, diazo compounds, esters, and sulfides.

22. The process of claim 1, wherein the silane further contains a hydrophobic substituent selected from the group consisting of aryl radicals, and aralkyl radicals.

23. The process of claim 1, wherein the silane further contains a hydrophylic substituent selected from the group consisting of hydroxyl, ester, and acid radical.

24. The process of claim 1, wherein the silane in the formed membrane further contains a substituent selected from the group consisting of tertiary or quaternary amino groups, phenolic hydroxyl groups, and aliphatic or aromatic —SO$_3$— or COO— groups.

* * * * *